United States Patent
Ruiz et al.

(10) Patent No.: US 7,756,380 B2
(45) Date of Patent: Jul. 13, 2010

(54) HINGED CABLE GUIDE PANEL PROVIDING ACCESS TO PANEL REAR

(75) Inventors: Gil Ruiz, McKinney, TX (US); Timothy W. Anderson, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 105 days.

(21) Appl. No.: 12/183,132

(22) Filed: Jul. 31, 2008

(65) Prior Publication Data
US 2010/0027952 A1 Feb. 4, 2010

(51) Int. Cl.
*G02B 6/00* (2006.01)
(52) U.S. Cl. .................... 385/135; 385/134; 385/136
(58) Field of Classification Search .......... 385/134–136
See application file for complete search history.

(56) References Cited

U.S. PATENT DOCUMENTS

| | | | |
|---|---|---|---|
| 4,824,196 A | | 4/1989 | Bylander |
| D466,087 S | * | 11/2002 | Cuny et al. ................ D13/152 |
| 6,631,237 B2 | * | 10/2003 | Knudsen et al. ............. 385/134 |
| 6,760,531 B1 | | 7/2004 | Solheid |
| 6,850,685 B2 | * | 2/2005 | Tinucci et al. .............. 385/134 |
| 7,200,317 B2 | | 4/2007 | Reagan |
| 7,369,741 B2 | | 5/2008 | Reagan |
| 7,400,816 B2 | * | 7/2008 | Reagan et al. ............... 385/139 |

OTHER PUBLICATIONS

"DCS Connectivity Innovation" web page showing SL8500 modular fiber terminal. http://www.datacentersys.com/SL8500/modular-fiber-terminal.html retrieved Jul. 9, 2008.

\* cited by examiner

*Primary Examiner*—Ellen Kim
(74) *Attorney, Agent, or Firm*—Muncy, Geissler, Olds & Lowe, PLLC

(57) ABSTRACT

A cable guide includes a hinge support having a first end and a second end, a panel hingedly connected to the hinge support and having at least one through-opening, and at least one cable connection module, having a front and a rear, mounted in the at least one through-opening, the at least one cable connection module front having at least one port accessible from the front side of the panel and the cable connection module rear having at least one port accessible from the rear side of the panel, the cable guide also including a first arm projecting away from the first end of the hinge support, the first arm having at least one cable aperture configured to receive a cable.

18 Claims, 6 Drawing Sheets

HINGED CABLE GUIDE PANEL PROVIDING ACCESS TO PANEL REAR

FIELD OF THE INVENTION

The present invention is directed toward a hinged cable guide panel that allows access to the rear of the panel, and, more specifically, toward a hinged cable guide panel configured to guide trunk cables from a front side of the panel to a rear side of the panel and to guide patch cords away from front sides of the panel in a manner that allows the panel to pivot between first and second positions.

BACKGROUND OF THE INVENTION

Various connectors are known for connecting one cable to another and for providing multiple output connections for a single input connection. Such connectors or modules are commonly used in fiber optic applications and may include one or more rear ports that connect to a fiber optic trunk cable and two or more front ports for each of the rear ports which front ports are connectable to patch cords. The rear ports may comprise, for example, multifiber push on (MPO) adapters. One such module is sold by CommScope, Inc. under the trade name "INSTAPATCH," and allows for the rapid interconnection of fiber optic cables.

Modules such as the above-mentioned INSTAPATCH module are useful when mounted on racks or in similar environments where users have easy access to both the front and rear of the module. However applications also exist where such modules are mounted in front of a blind compartment where access to the rear of the module is difficult or not possible after the module is installed. In such situations, modules must be physically removed from a mount or the mount must be disconnected from a supporting structure each time access to the adapters in the rear of the module is necessary.

When trunk cables approach the connection module from the rear, from an internal conduit or access path, for example, the connection modules can be mounted on a hinged support that allows for access to the rear of the panel. The fan-out cables are pulled partially out of the compartment when the hinged panel opens in such arrangements. However, in other environments, such as in tape storage devices like the SL8500 Sun Storage Tek Storage Library of Sun Microsystems, Inc., both trunk lines and patch cords approach the connection modules from the same side of the data storage device. A conventional hinged panel would not be effective for such a system because bend radius rules would likely be violated when the panel opens and closes and it would be difficult to avoid damaging the cables, especially the trunk cables, when the panel was moved. In addition, the presence of trunk cables on the front of a movable panel might make it difficult to open the panel in the first place.

One solution to the problem of trunk cables and patch cords approaching a support panel from the same side is to provide connection modules that include MPO adapters for incoming trunk cables and outgoing patch cords on the same side (the front) of the connection module. This arrangement avoids the need to access the rear of the connection modules. However, this arrangement also reduces the number of ports for patch cords that can be provided in a given area because the ports for receiving the trunk cables take up valuable real estate on the front of the connection module. In addition, routing both trunk cables and patch cords over a single face of the panel that supports the module makes it more difficult to determine which cable is which and makes the installation and maintenance of such panels more complex.

It would therefore be desirable to provide an arrangement that allows for the use of connection modules having front and rear ports and for ready access to the rear ports in an environment in which trunk cables approach the modules and patch cords exit the modules from the same side of the module.

SUMMARY OF THE INVENTION

These and other problems are addressed by embodiments of the present invention, a first aspect of which comprises a cable guide that includes a hinge support having a first end and a second end and a panel hingedly connected to the hinge support. The panel has a front side and a rear side, a top edge and a bottom edge, and first and second side edges between the top edge and the bottom edge, as well as at least one through-opening between the front side and the rear side. At least one cable connection module, having a front and a rear, is mounted in the at least one opening, and the cable connection module front has at least one port facing in a first direction and accessible from the front side of the panel, and the cable connection module rear has at least one port accessible from the rear side of the panel. The cable guide also includes a first arm projecting away from the first end of the hinge support, and the first arm has at least one cable opening facing in the first direction and configured to receive a cable.

Another aspect of the invention comprises a network equipment holder with a housing that includes a compartment having a closed back and open front and a cable guide mounted in the open front of the compartment. The cable guide, in turn, includes a panel hingedly supported on the network equipment holder for movement between a closed position covering at least a portion of the opening and an open position providing access to the compartment. The panel has a rear side facing into the compartment when the panel is in the closed position and a front side facing away from the opening. The cable guide further includes a plurality of trunk cable supports fixed relative to the compartment and a plurality of cable apertures fixed relative to the compartment. The cable guide also includes a plurality of modules having front and rear adapters mounted in the panel such that the rear adapters face into the compartment and the front adapters face out of the compartment when the panel is in the closed position. A cable management bar is connected to the rear side of the panel. A trunk cable passes through a first one of the cable apertures, is secured to one of the plurality of cable supports, and passes from the front of the panel into the compartment where it divides into a plurality of fan-out cables. Each of the fan-out cables is connected to the cable management bar. Patch cords are connected to the module front adapters and extend through a second one of the cable apertures. When the panel moves from the closed position to the open position, a portion of the trunk cable connected to the trunk cable support remains fixed relative to the network equipment holder, a portion of the patch cord in the second cable guide slides relative to the second cable aperture, and the rear adapters become accessible from outside the compartment.

A further aspect of the invention comprises a device that includes a frame having parallel first and second sides, the first and second sides having a top end and a bottom end. The frame further includes top and bottom sides connecting the first and second sides, and at least one of the top and bottom sides includes a slot configured to receive a cable. The first side has a wall projecting generally perpendicularly to the first side and also has a trunk cable aperture configured to receive at least one trunk cable and a patch cord aperture to receive at least one patch cord. The device also includes a panel having a front side and a rear side and first and second side edges, the panel first side edge being connected to the frame first side by a hinge. The panel further includes a recessed central portion and at least one through-opening between the front side and the rear side in the recessed central portion. The second side edge forms a first stop for limiting movement of the panel in a first direction relative to the frame, and the rear side includes a second stop for limiting movement of the panel in a second direction relative to the frame. Cable connection modules are mounted in the at least one through-opening, and each cable connection module has a front with a plurality of front ports accessible from the front side of the panel and a rear with a rear port accessible from the rear side of the panel. A cable management bar extends across the rear of the plurality of cable connection modules. A trunk cable extends through the trunk cable aperture in the wall and through the slot in the at least one of the top and bottom sides, and splits into at least two fan-out cables on the rear side of the panel. The at least two fan-out cables are connected to rear ports of the cable connection modules and are tied to the cable management bar. In addition, patch cords are connected to the front ports of the cable connection module and extend through the patch cord apertures in the wall. The panel is configured to pivot between a first, closed, position and a second, open, position relative to the frame, the first stop engaging the frame in the first position and the second stop engaging the frame in the second position.

BRIEF DESCRIPTION OF THE DRAWINGS

These and other aspects and features of the invention will be better understood from a reading of the following detailed description together with the accompanying drawings wherein.

DETAILED DESCRIPTION

Figure 1:
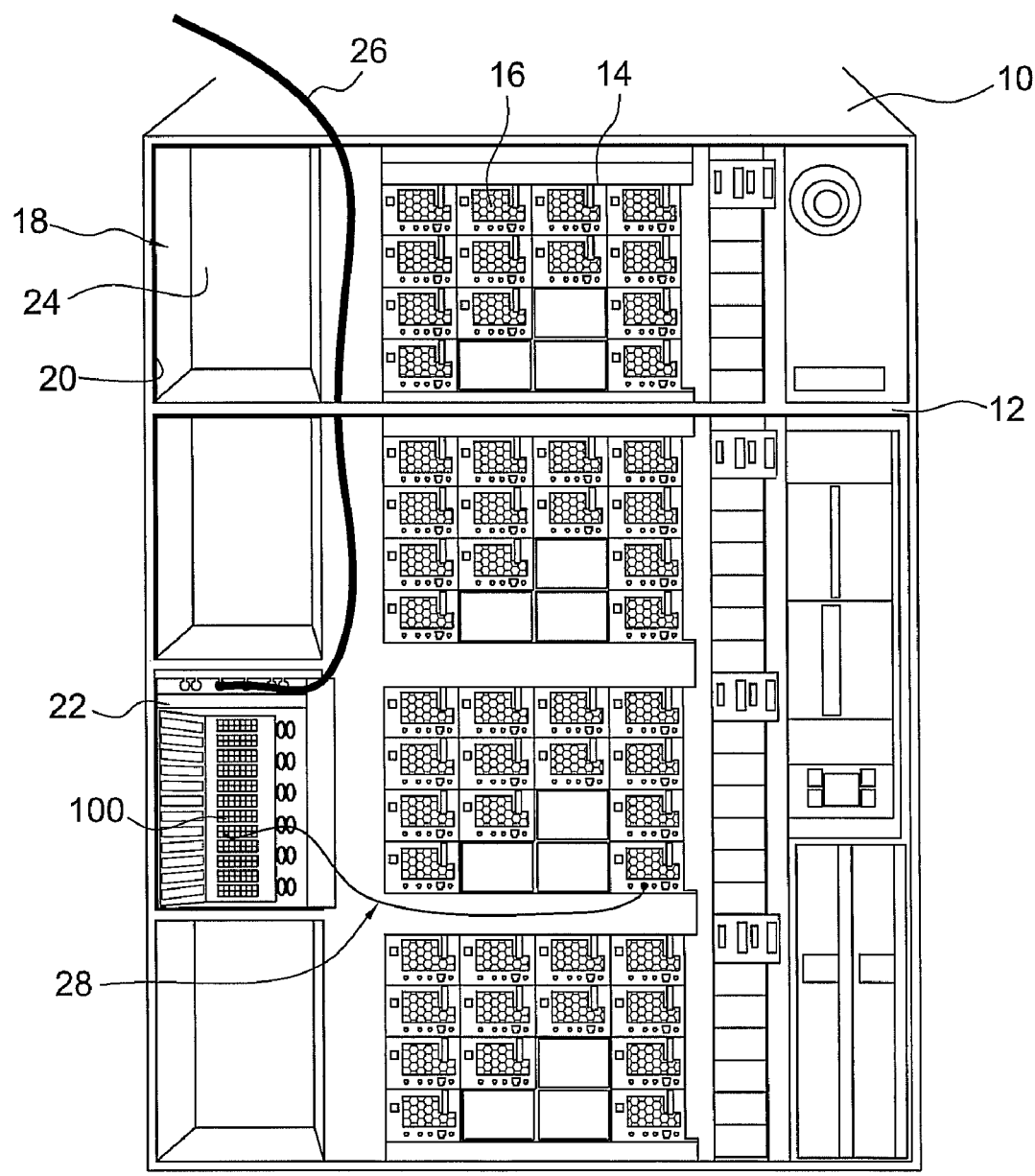
FIG. 1 is front elevational view of a network equipment holder having a plurality of compartments for receiving a cable guide and a cable guide according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Referring now to the drawings, wherein the showings are for purposes of illustrating presently preferred embodiments of the invention only and not for the purpose of limiting same, FIG. 1 shows a network equipment holder 10 for storing, for example, networking and/or telecommunications equipment. In one embodiment of the invention, the network equipment holder comprises a tape storage library, and this tape storage library is discussed hereinafter. Network equipment holder 10 includes a first side 12 with a plurality of openings 14 in which tape drives 16 are mounted and a plurality of compartments 18 having openings 20 in which cable guide panels 22 according to embodiments of the present invention can be mounted. Only one cable guide panel 22 is illustrated in FIG. 1; the other compartments 18 are empty, and it can be seen that these compartments 18 have rear walls 24. Additional elements of network equipment holder 10 are located behind rear walls 24 of compartments 18. Therefore, when opening 20 is covered by a conventional cable guide panel (not illustrated) that is screwed or otherwise fixed over opening 20, it is not possible to access the side of that conventional cable guide panel that faces into compartment 18 without removing the entire conventional cable guide panel.

A single trunk cable 26 is illustrated coming from a data source (not illustrated) along the first side 12 of network equipment holder 10 and entering compartment 18 over the top side of cable guide panel 22, and a single patch cord 28 is illustrated leaving the front of cable guide panel 22 and connecting to one of the tape drives 16. For clarity of illustration, only one trunk cable 26 and one patch cord 28 are shown; in use, multiple trunk cables and patch cords will be present. The arrangement and connections of these various cables will be described in greater detail hereinafter.

Figure 2:
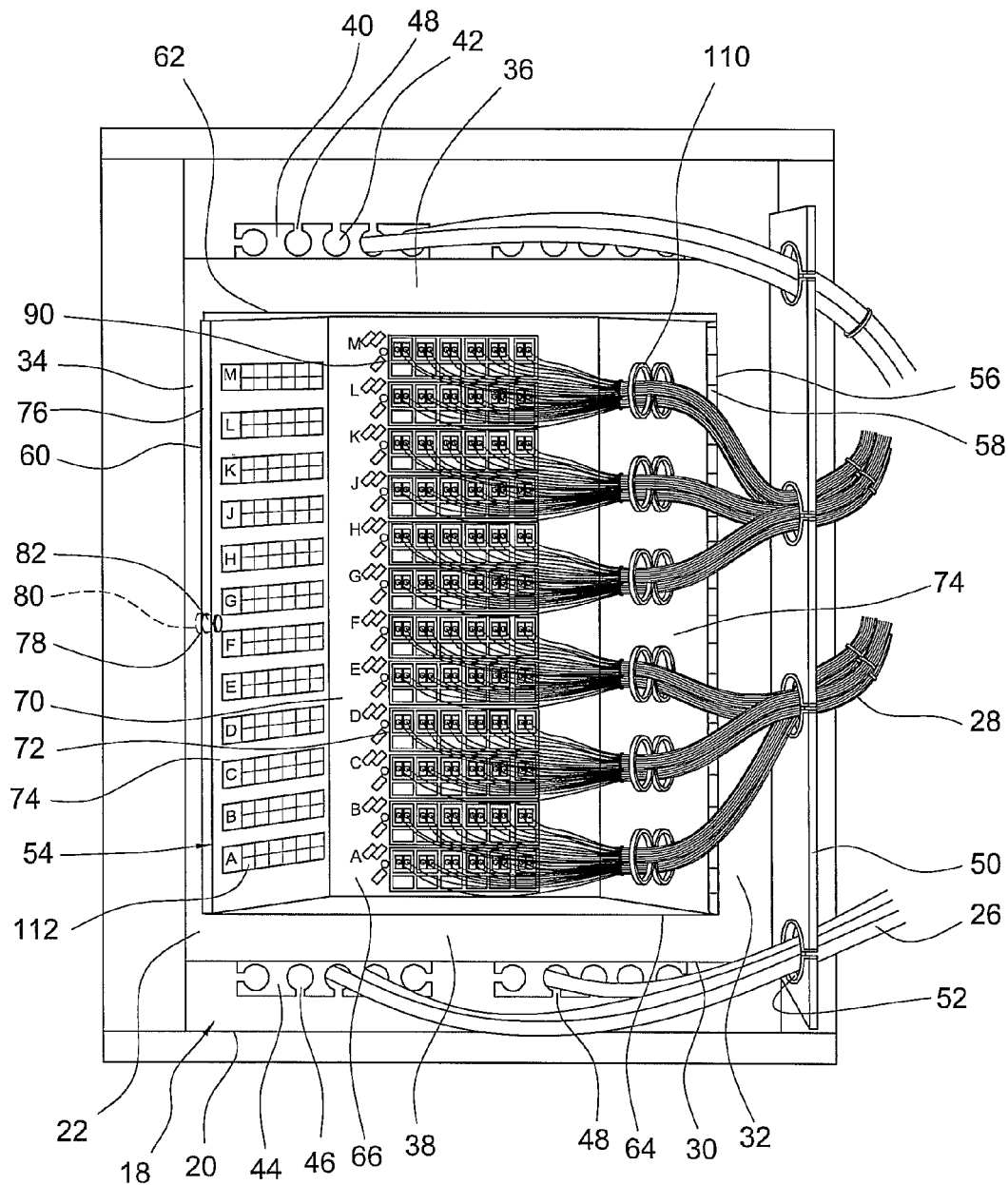
FIG. 2 is a front elevational view of the cable guide of FIG. 1, a plurality of connection modules mounted in the cable guide, a plurality of trunk cables approaching the cable guide from the front side thereof and a plurality of patch cords leaving the front side of the connection modules.

Cable guide panel 22 mounted in one of the openings 20 of compartment 18 is illustrated in FIG. 2. Cable guide panel 22 includes a frame 30 having a first side 32, a second side 34 parallel to first side 32, and a top 36 and a bottom 38 that connect the first and second sides 32, 34. Frame 30 is sized to fit in opening 20, and the size can be changed as necessary depending on the size of the particular opening of the device on which the cable guide panel 22 is mounted. Frame top 36 includes a projecting flange 40 having a plurality of slots 42, and frame bottom 38 includes a projecting flange 44 having a plurality of slots 46. The top and bottom slots 42, 46 may have openings 48 facing away from the cable guide panel 22 or in the direction of one of the first and second sides 32, 34. First side 32 of frame 30 includes a projecting flange 50 having a plurality of cable apertures 52. The function of the top and bottom slots 42, 46 and cable apertures 52 will be described hereinafter.

Figure 4:
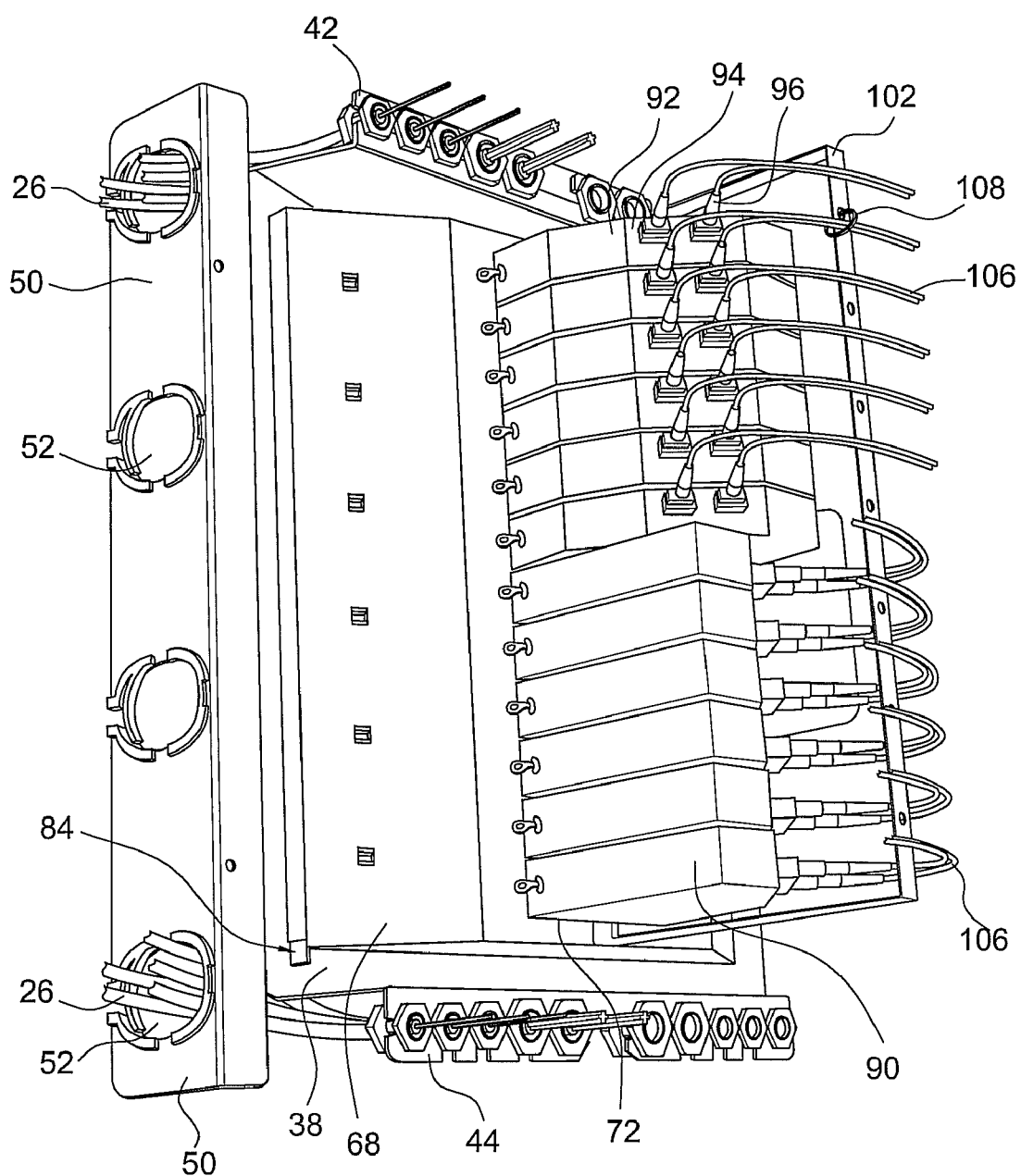
FIG. 4 is a rear perspective view of the cable guide of FIG. 2 in a closed position.

Cable guide panel 22 further includes a panel member 54 having a first side edge 56 connected to frame first side 32 by a hinge 58. Panel member 54 also includes a second side edge 60, a top edge 62, a bottom edge 64, a front side 66 and a rear side 68 (illustrated in FIGS. 4 and 6). The panel member 54 has a recessed central portion 70 having an opening 72 and first and second angled walls 74 extending away from recessed central portion 70 toward the first and second side edges 56, 60 of panel member 54. Panel member 54 is mounted so as to be free to pivot between open and closed positions relative to frame 30.

Figure 7:
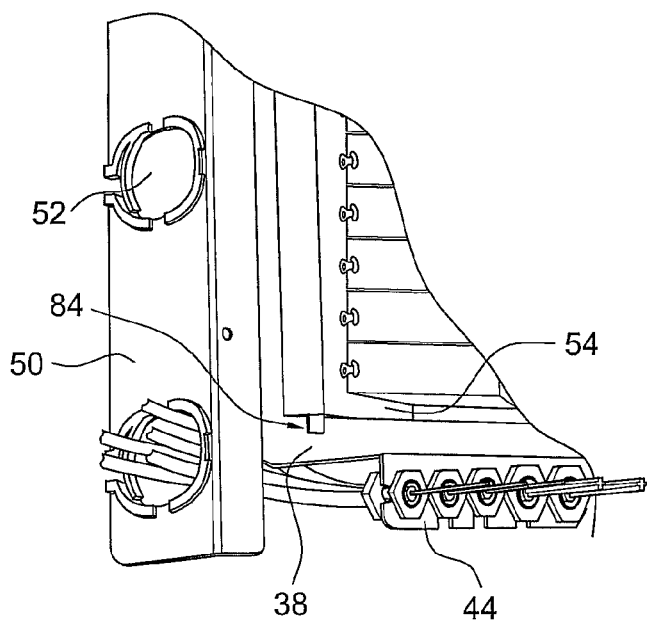
FIG. 7 is a partial rear perspective view of cable guide of FIG. 2 in a fully opened position.

A first stop 76 is formed by a projecting portion of the second side edge 60 of panel member 54 which overlies a portion of frame second side 34 when panel member 54 is in the closed position to substantially prevent panel member 54 from rotating more than a given distance into compartment 18. Second side edge 60 of panel member 54 also includes a opening 78 that is aligned with an opening 80 in frame second side 34 when panel member 54 is in the closed position, and a plunger fastener 82 is mounted in opening 78. When plunger fastener 82 is pressed into opening 80 in frame second side 34, panel member 54 is fixed relative to frame 30. When plunger fastener 82 is withdrawn from opening 80, second side edge 60 of panel member 54 is free to swing about hinge 58 away from frame 30. Panel member 54 further includes a second stop in the form of a projecting tongue 84 (FIG. 4) extending from the bottom portion of rear side 68 of panel member 54 which is generally perpendicular to frame bottom 38 when panel member 54 is in the closed position. However, projecting tongue 84 abuts against the rear portion of frame bottom 38, as illustrated in FIG. 7, when panel member 54 projects approximately 90 degrees relative to frame 30 to substantially limit the pivotal motion of panel second side edge 60 away from frame 30.

A plurality of fiber connection modules 90 are mounted in opening 72 in panel member 54, which fiber connection modules may comprise INSTAPATCH brand connection modules available from CommScope, Inc. Fiber connection modules 90 include back sides 92 having ports 94, compatible with MPO adapters 96 on can-out cables 106 connected thereto and front sides 98 having ports 100 connectable to patch cords 28. A cable management bar 102 is mounted on rear side 68 of panel member 54 which cable management bar 102 projects away from panel member 54 and passes over the back sides 92 of the fiber connection modules 90.

Figure 3:
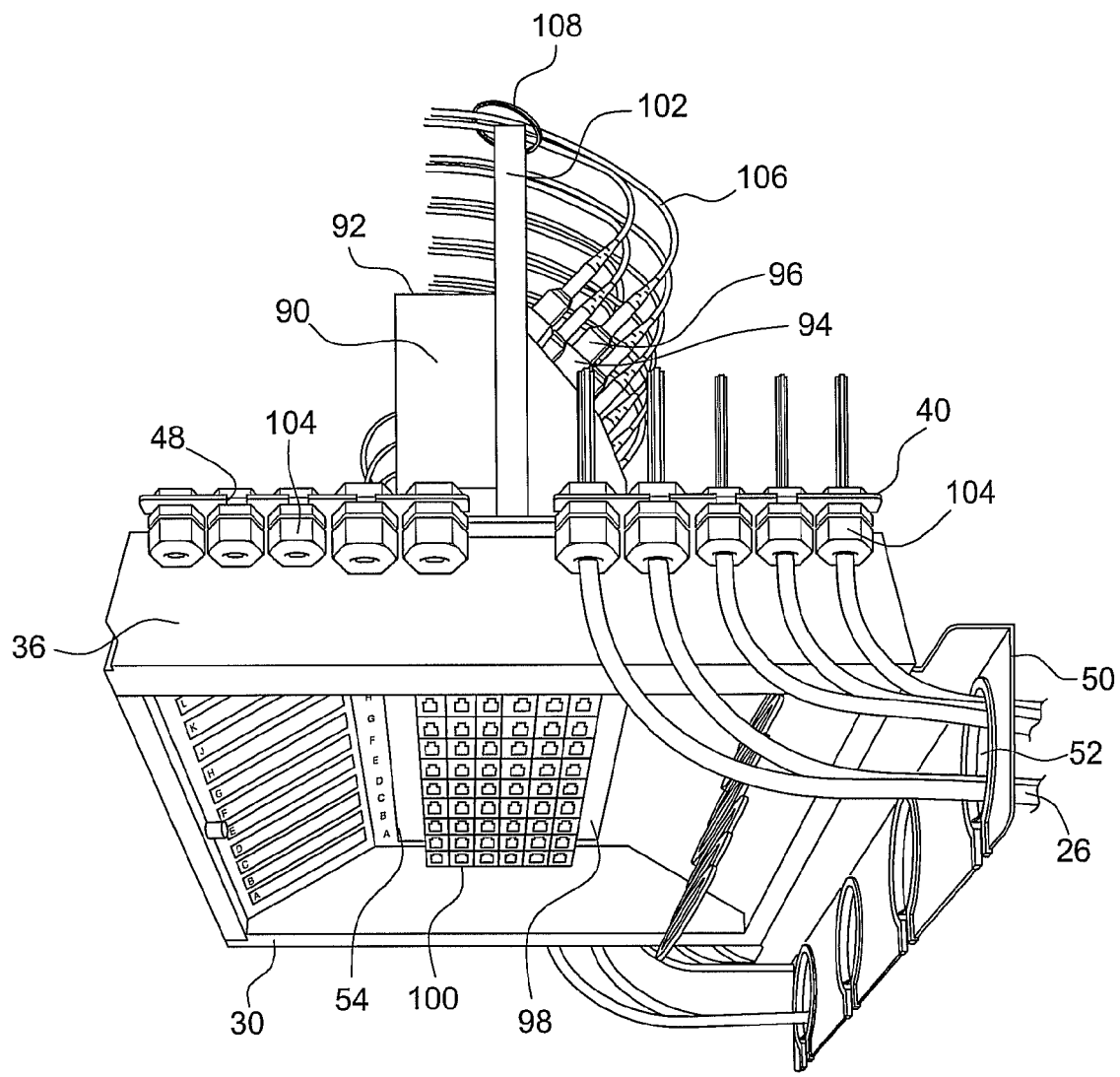
FIG. 3 is a top perspective view of the cable guide of FIG. 2.

As illustrated in FIGS. 1 and 2, trunk cables 26 arrive at network equipment holder 10 and pass along first side 12 of the network equipment holder 10 to the one of cable guide panels 22 for which they are intended. The trunk cables 26 for that cable guide panel 22 pass through either the uppermost or lowermost one of the cable apertures 52 in projecting flange 50 and through slots 42 in projecting flange 40 on frame top 36 or slots 46 in projecting flange 44 on frame bottom 38. While slots 42 are illustrated, through-openings could be provided in the top and bottom projecting flanges 40, 44, for the trunk cables; however, this would require the trunk cables to be passed longitudinally through the through-openings instead of pressed laterally into the disclosed slots. Slotted sleeves 104, illustrated in FIG. 3, on the trunk cables 28 secure the trunk cables to the top and bottom projecting flanges 40, 44.

After passing through slots 42, 46 and into the interior of compartment 18, trunk cables 26 split into two or more fan-out cables 106, each of which is provided at its terminal end with a suitable adapter 96 configured to mate with one of the ports 94 on the back sides 92 of fiber connection modules 90. Approximately two feet total of trunk cable and fan-out cable is provided between the projecting flanges 40, 44 and the adapters 96 to provide slack to allow panel member 54 to move as described below. The fan-out cables 106 are connected to cable management bar 102 by suitable ties 108 to help maintain the relationship between the back sides 92 of the fiber connection modules 90 and the portion of the fan-out cables 106 in the vicinity of the back sides 92 of the fiber connection modules 90 to minimize stress on the adapters 96 when panel member 54 moves as described below.

A plurality of patch cords 28 are connected to the ports 100 on the front sides 98 of the fiber connection modules 100, and these patch cords 28 are bundled and passed through patch cord supports 110 on one of angled walls 74 of panel member 54 and through the central ones of the cable apertures 52 in the projecting flange 50 of frame first side 52. From the projecting flange 50, the patch cords run to various ones of tape drives 16 or other data storage elements. A label 112 is provided on one of the angled walls 74 to help identify each of the ports 100 on a given one of the fiber connection modules 90.

Figure 5:
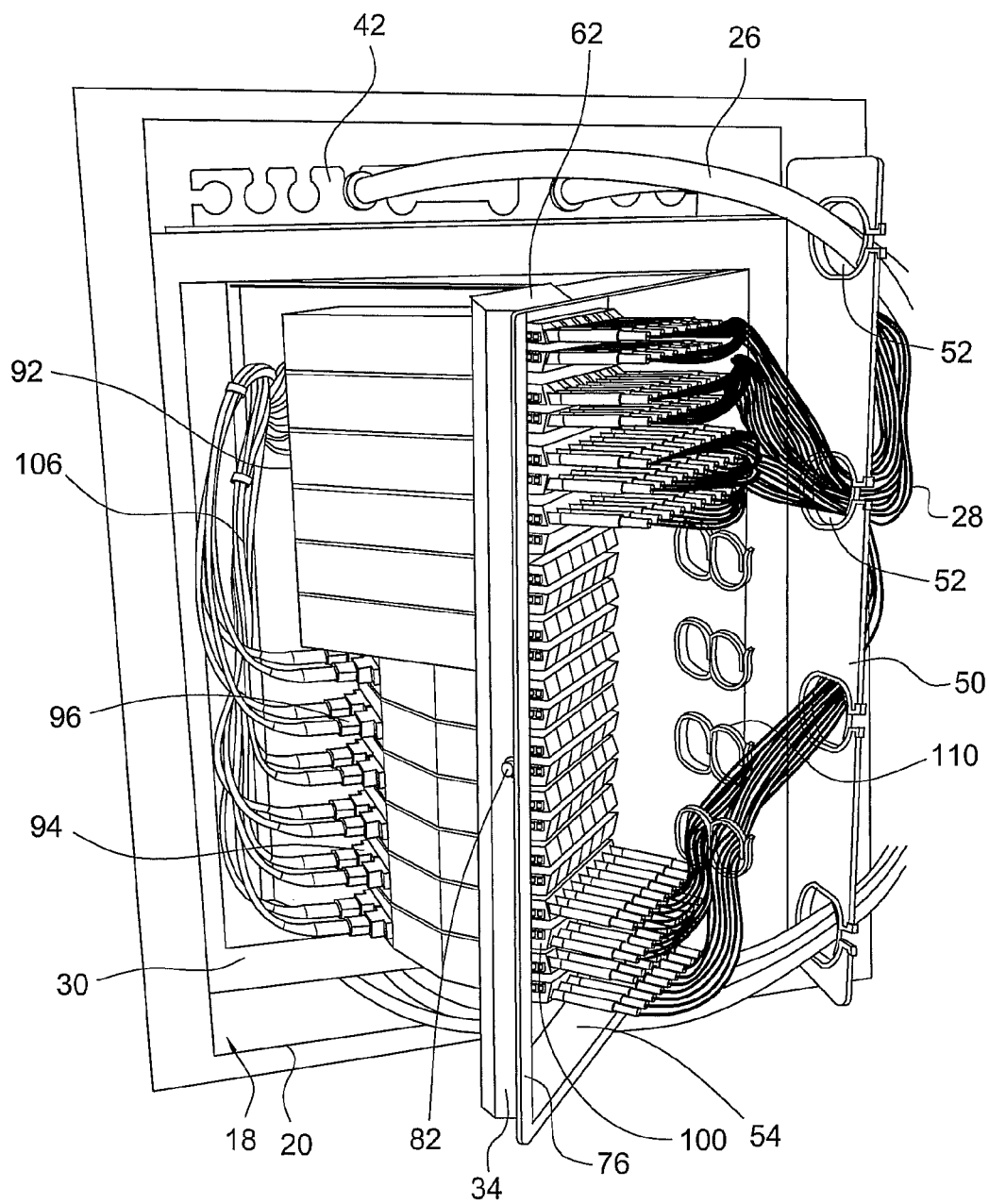
FIG. 5 is a front perspective view of the cable guide of FIG. 2 in a partially opened position.
Figure 6:
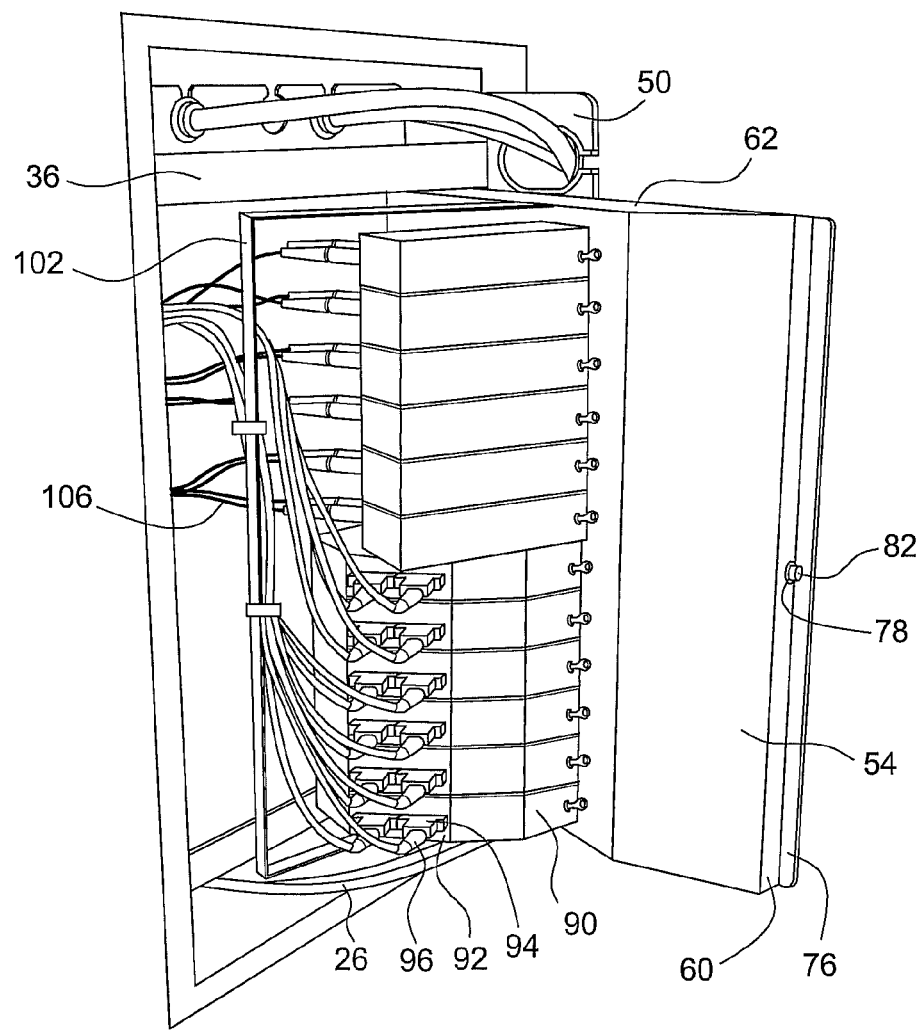
FIG. 6 is a front perspective view of the cable guide of FIG. 2 in a fully opened position.

As discussed above, panel member 54 is movable between a first, closed, position with first stop 76 in contact with frame second side 34 (FIG. 2) and a second, open position, with second stop or projecting tongue 84 in contact with the rear side of frame bottom 38. The open position is illustrated in FIG. 6; an intermediate position is illustrated in FIG. 5. As panel member 54 pivots from the closed position to the open position, the ties 108 secure the ends of the fan-out cables near the back sides 92 of the fiber connection modules 90 as the trunk cables 26 are partially pulled from compartment 18. The patch cords 28 in turn slide freely within cable openings 54 in projecting flange 50. The trunk cables 26, meanwhile, remain fixed in the vicinity of the projecting flanges 40, 44 of frame top and bottom 36, 38, respectively, while the slack in the trunk cables 26 and fan-out cables 106 in compartment 18 minimizes stress on the connections. In this manner, bend radius rules are maintained for all sections of the trunk cable 28, fan-out cables 106 and patch cords 28 as the panel member 54 shifts between open and closed positions. Moreover, panel member 54 can be moved between open and closed positions as necessary to make initial or new connections between fan-out cables 106 and the ports 94 on the back sides 92 of the fiber connection modules and then returned to the closed position and secured with plunger fastener 82 while the network equipment holder 10 is in use. This movement between open and closed positions does not violate bend radius rules for any of the cables connected to the cable guide panel 22 and does not require the disconnection of any of the patch cords connected to the ports 100 on the front side 98 of the fiber connection modules 90. Beneficially, the above-described arrangement allows conventional fiber connection modules, such as fiber connection modules 90, to be used regardless of whether rear access is available and avoids the need to design and/or stock alternate modules for this special application.

The present invention has been described herein in terms of one or more preferred embodiments. Changes and additions to these embodiments will become apparent to those of ordinary skill in the art upon a reading of the foregoing description. It is intended that all such modifications and additions comprise a part of the present invention to the extent they fall within the scope of the several claims appended hereto.

What is claimed is:

1. A cable guide comprising:
a hinge support having a first end and a second end;
a panel hingedly connected to the hinge support, the panel having a front side and a rear side, a top edge and a bottom edge, and first and second side edges between the top edge and the bottom edge, the panel further including at least one through-opening between said front side and said rear side;
at least one cable connection module, having a front and a rear, mounted in the at least one opening, the at least one cable connection module front having at least one port facing in a first direction and being accessible from the front side of the panel and the cable connection module rear having at least one port accessible from the rear side of the panel; and
a first arm projecting away from the first end of the hinge support, the first arm having at least one cable opening facing in the first direction and configured to receive a cable connected to the rear of the at least one cable connection module.

2. The cable guide of claim 1 including a wall extending generally perpendicularly from said hinge support and including at least one cable aperture.

3. The cable guide of claim 1 wherein the first arm is connected to the hinge support and including a second arm connected to the second end of the hinge support and a connection member connecting the first arm to the second arm to form a frame having a front and a rear.

4. The cable guide of claim 3 including a first stop for limiting pivotal motion of the panel relative to the frame in a first direction.

5. The cable guide of claim 4 including a second stop for limiting pivotal motion of the panel relative to the frame in a second direction.

6. The cable guide of claim 3 wherein said panel includes a recessed central portion and wherein said at least one through-opening is located in said recessed central portion, the at least one cable connection module being located completely on the rear side of said frame.

7. The cable guide of claim 3 wherein said second arm includes at least one cable opening configured to receive a cable.

8. The cable guide of claim 3 wherein said at least one cable opening in said first arm comprises a plurality of slots each configured to receive a cable and wherein said second arm includes a plurality of slots each configured to receive a cable.

9. The cable guide of claim 8 wherein at least one of said slots in said first arm has an opening facing away from said frame.

10. The cable guide of claim 3 wherein said first stop comprises a projecting portion of said connection member.

11. The cable guide of claim 5 wherein said second stop comprises a tongue projecting from a rear side of said panel on the rear side of the frame and configured to engage the frame when the panel pivots through a given angle relative to said frame.

12. The cable guide of claim 1 including a cable management bar connected to said panel rear and having a first portion overlying and spaced from the rear of the at least one cable connection module.

13. The cable guide of claim 1 wherein said at least one port accessible from the rear side of the panel comprises a multi-fiber push on adaptor.

14. The cable guide of claim 2 including a trunk cable passing through said at least one cable aperture in said wall and said at least one cable opening in said first arm, said trunk cable splitting into at least two fan-out cables on the rear side of said panel, said at least two fan-out cables being attached to a cable management bar extending adjacent to the rear of the at least one cable connection module and connected to said at least one port accessible from the rear side of the panel.

15. A network equipment holder having a housing including a compartment having a closed back and open front and a cable guide mounted in the open front of the compartment,
the cable guide comprising a panel hingedly supported on the network equipment holder for movement between a closed position covering at least a portion of said opening and an open position providing access to the compartment, the panel having a rear side facing into the compartment when the panel is in the closed position and a front side facing away from the opening, the cable guide further including a plurality of trunk cable supports fixed relative to the compartment and a plurality of cable apertures fixed relative to the compartment;
a plurality of modules having front and rear adapters mounted in the panel such that the rear adapters face into the compartment and the front adapters face out of the compartment when the panel is in the closed position;
a cable management bar connected to the rear side of the panel;
a trunk cable passing through a first one of the cable apertures and connected to one of the plurality of cable supports and passing from the front of the panel into the compartment, each of the trunk cables dividing into a plurality of fan-out cables in the compartment, each of the fan-out cables being connected to the cable management bar and to one of the rear adapters of the module;

a plurality of patch cords connected to the module front adapters and extending through a second one of the cable apertures;

wherein, when said panel moves from said closed position to said open position, a portion of said trunk cable connected to the trunk cable support remains fixed relative to the network equipment holder, a portion of the patch cord in the second cable guide slides relative to the second cable aperture, and the rear adapters become accessible from outside the compartment.

16. The network equipment holder of claim 15 wherein said panel includes a first stop for limiting pivotal movement of said panel into said compartment.

17. The network equipment holder of claim 16 including a second stop for limiting pivotal movement of said panel away from said compartment.

18. A device comprising:

a frame having parallel first and second sides, the first and second sides having a top end and a bottom end, the frame further including top and bottom sides connecting the first and second sides, at least one of the top and bottom sides including a slot configured to receive a cable, the first side including a wall projecting generally perpendicular to the first side and having a trunk cable aperture configured to receive at least one trunk cable and a patch cord aperture configured to receive at least one patch cord;

a panel having a front side and a rear side and first and second side edges, the panel first side edge being connected to the frame first side by a hinge, the panel further including a recessed central portion and at least one through-opening between said front side and said rear side in the recessed central portion, the second side edge forming a first stop for limiting movement of the panel in a first direction relative to the frame, and the rear side including a second stop for limiting movement of the panel in a second direction relative to the frame;

a plurality of cable connection modules mounted in the at least one through-opening, each cable connection module having a front with a plurality of front ports accessible from the front side of the panel and a rear having a rear port accessible from the rear side of the panel;

a cable management bar extending across the rear of the plurality of cable connection modules;

a trunk cable extending through said trunk cable aperture in said wall and through said slot in the at least one of the top and bottom sides, the trunk cable splitting into at least two fan-out cables on the rear side of the panel, the at least two fan-out cables being connected to rear ports of the cable connection modules and tied to the cable management bar; and a plurality of patch cords connected to the front ports of the cable connection module and extending through the patch cord aperture in the wall;

wherein, the panel is configured to pivot between a first, closed, position and a second, open, position relative to the frame, the first stop engaging the frame in the first position and the second stop engaging the frame in the second position.

* * * * *